May 2, 1950 — R. P. RICHARDSON ET AL — 2,505,835
FLAT PRIMARY DRY CELL
Filed Nov. 11, 1944

INVENTORS
Richard Percy Richardson; Richard Walter Lewis
By G. A. Oxell
Attorney.

Patented May 2, 1950

2,505,835

UNITED STATES PATENT OFFICE 2,505,835

FLAT PRIMARY DRY CELL

Richard Percy Richardson and Richard Walter Lewis, Erith, England, assignors to Burndept Limited, Erith, England, a company of Great Britain Application November 11, 1944, Serial No. 562,994
In Great Britain September 17, 1943

Section 1, Public Law 690, August 8, 1946
Patent expires September 17, 1963

4 Claims. (Cl. 136—111)

This invention relates to primary electric batteries of the layer type, that is to say batteries of cells in which the electrodes and other components are substantially flat and stacked one upon the other.

One purpose of the invention is to produce a battery of this kind which will not leak, and so will not have its voltage impaired by the short-circuiting of one or more cells by escaping electrolyte, nor its life shortened by undesired passage of current when the battery is not in use.

A further purpose of the invention is to produce a battery in which the risk of metallic short-circuiting of cells is reduced to a minimum.

Yet another purpose of the invention is to produce a battery the elements of which are readily handled without damage in the course of manufacture.

It is well known in this class of battery to make either the positive electrode or the negative electrode in the form of a shallow dish or pan, and to assemble the components of a cell within this hollow electrode.

It is also well known to assemble the electrodes and other components of a cell within a dish or pan of sheet insulating material, such as a plastic, and to make such dishes or pans of such a shape that they will nest one within the other.

In the battery of the present invention the negative electrodes are made in the form of a dish or pan, which not only receives the several components of a cell but also is shaped to receive a part of the negative electrode of the cell next above it, superposed upon and enclosing its own assembled components; while also it is itself adapted to nest similarly within the negative electrode of the cell next below it.

The invention also includes a novel shape of negative electrode adapted for nesting as well as for containing the other components of a cell.

The invention also includes a construction of battery built of cells assembled in their nested negative electrodes in which the nesting parts of the negative electrodes are thoroughly separated the one from the other both mechanically and electrically, so that no contact can be established between them even though the edge of one may be inadvertently left with a burr or projecting roughness.

The above and other purposes and features of the invention will appear more particularly from the following description of an example of construction of the invention which is illustrated by the accompanying drawings.

In these drawings.

Figures 1, 2, 3, 4, 5, 6:
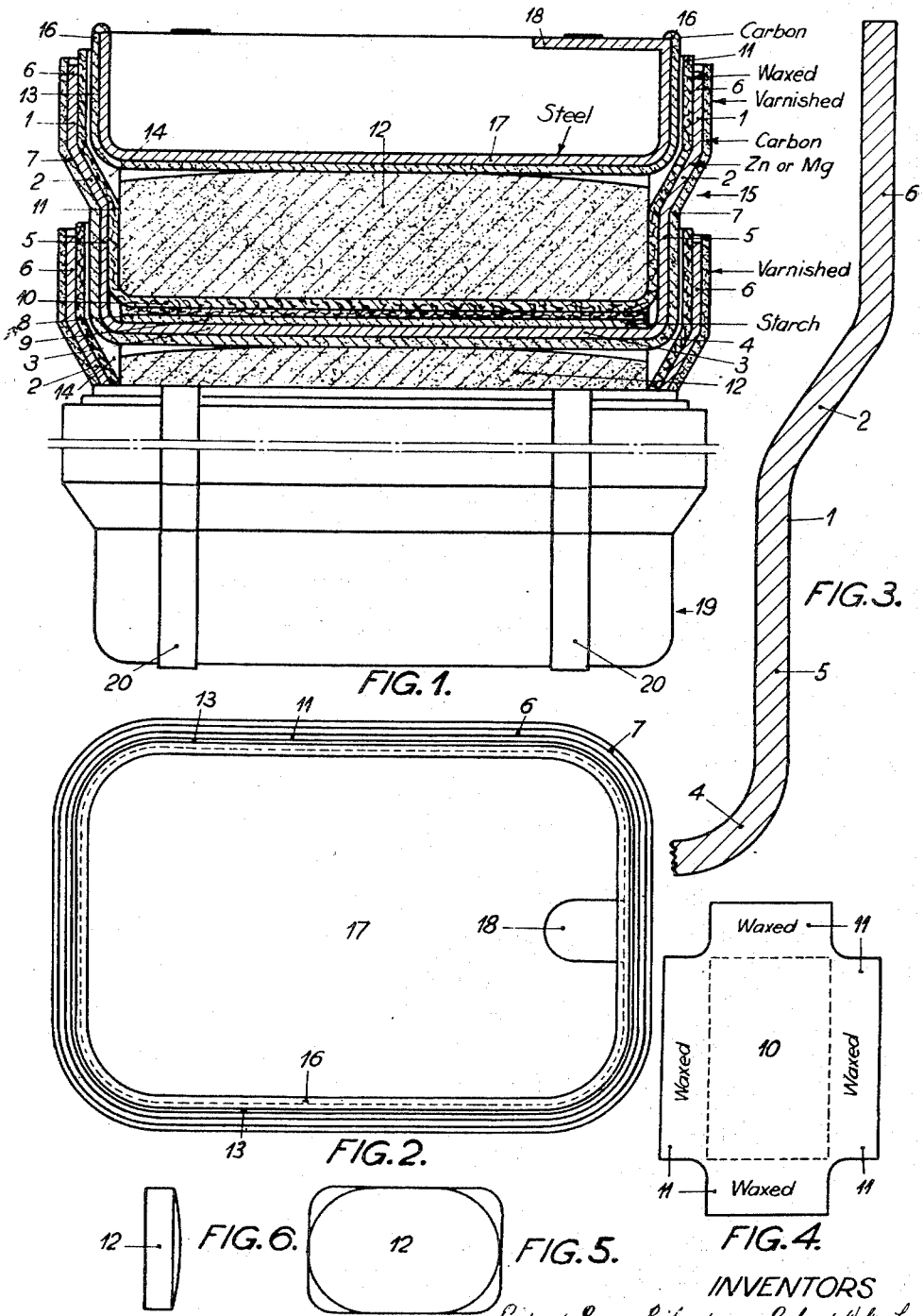
Figure 1 is an elevation partly in median section on an enlarged scale of a pile of cells assembled in nested relation to form a battery.
Figure 2 is a plan of the pile of cells.
Figure 3 is a still further enlarged section through the wall of one negative electrode, showing in further detail a preferred form well adapted for nesting.
Figure 4 shows on a smaller scale a blank from which is made a component for ensuring insulation of one cell from another.
Figures 5 and 6 are views at right angles of the depolariser component of a cell.

As is well known the common dry cell comprises an electrode of electro-negative metal, usually magnesium or zinc, and herein referred to as zinc, a positive electrode of carbon, a depolarizing mix, preferably of carbon and manganese dioxide interposed between the electrodes, and an electrolyte which establishes a conductive path between the electrodes but is not in freely fluid form, and which preferably includes zinc chloride, ammonium chloride, and a small proportion of mercury chloride.

In the battery of this invention the negative electrode is a flat-bottomed zinc pan 1 of a form adapted for nesting, that is to say, its internal dimensions in the neighborhood of the lip of the pan slightly exceed the external dimensions of the lower part of the pan. While this condition may be satisfied by a pan of simple tapering form it is preferred to make the pan with a distinct shoulder 2 within it intermediate between its bottom and its lip. The flat bottom 3 is of rectangular form with rounded corners and merges through rounded edges 4 into substantially vertical lower walls 5. At the shoulder 2 the internal dimensions of the pan are increased in all directions parallel to the bottom by at least twice the thickness of the pan. In the construction illustrated, as may be readily seen from Figure 3, the increase in dimensions at the shoulder 2 is substantially greater than twice the thickness of the pan so that the upper substantially vertical wall 6 above the shoulder 2 can accommodate not only the lower portion 5 of the next cell above but also a stout interposed layer of insulation as described below. The pans 1 may be "rumbled" after pressing to round off their sharp edges, and remove any projecting scarf of metal which may chance to have been formed While cells of the layer type may have positive electrodes in the form of thin plates of carbon, a more usual construction is to make the positive electrode a coating of carbon upon the negative electrode; this course is followed in the construction illustrated. The whole of the outer surface of each zinc pan 1 is coated with a layer of carbon 7 by spraying upon the inverted pan, or pouring over it, a suspension of finely divided carbon in a medium which dries out leaving an adherent coating; or the pan, in upright position, may be dipped into such a paint. The spraying, pouring or dipping process may be repeated until the desired thickness of carbon is obtained.

If desired the coating of the outside of the zinc pan 1 with carbon may be followed by application of a coating of insulating varnish to the outer surface of the upper wall 6, the shoulder 2 and the lower wall 5 but not to the bottom 3. Such a coating is of assistance in preventing metallic contact between the nested parts of the zinc pans, it also hinders leakage of any fluid which may be freed in the course of the life of the battery; and it may be utilized to key on a coating of insulation applied to the battery as a whole after assembly. But as such a coating is thin, and might be penetrated by a sharp edge or scarf of metal projecting from the edge of the pan 1 it is preferred to employ instead or in addition a separate insulating member as described below.

There are many ways known in which electrolyte may be incorporated in the cell. In the construction illustrated there is placed within the pan 1 a simple rectangular sheet of bibulous paper 8, on which is a coating 9 of a starch mixture or like mucilaginous or jelly-like substance which can absorb and retain a liquid electrolyte; the coating 9 is placed next the zinc. This sheet 8 might be made of large size to line the cell and its edges be treated to enable it to serve as an insulator in place of the element next to be described; but it is found more convenient to construct it for the one function of absorbing and retaining electrolyte. It may be impregnated with electrolyte before being placed in the cell.

Next this electrolyte-containing layer it is preferred to provide a cell lining 10 of a paper material, which both covers the electrolyte-containing layer and lines the walls of the pan up to the lip of the pan. This must be permeable by the electrolyte in its flat middle part, and this part shares the electrolyte-retaining function of the layer 8, 9. But the edges of the sheet 10, which, as appears from Figure 1, come to lie between the zinc pan they line and the lower portion 5 of the pan next above nested within it, have the function of separating the cells both mechanically and electrically. For mechanical strength, to resist penetration by a sharp edge of metal, the sheet 10 may be of stout card or like paper product. It is convenient first to cut a blank in the form shown in Figure 4, so that the marginal parts 11 may fold up when the lining is pressed into the pan, without bulky creasing at the corners. Since the material of the lining is permeable, electrolyte must be prevented from reaching the marginal parts 11. To this end these may be impregnated with insulating material, such as paraffin wax. This may be done by dipping the inverted lined zinc pans into a shallow bath of molten wax, allowing only sufficient time for the wax to penetrate the marginal parts 11, and not giving it time to reach the flat centre part of the lining. As shown in Figure 1 the lining 10 may with advantage be made of such size that its edges project beyond the lip of the zinc pan.

Upon the sheet 10 is placed a tablet or lozenge of depolariser mix 12, which may be of the slightly domed form shown in Figures 5 and 6.

Liquid electrolyte is then added to the cell and time allowed for it to penetrate all the porous components.

Cells to the number required for the voltage the battery is to give are then nested in one or more piles as shown in Figure 1, so that the carbon coating 7 on the bottom of one pan 1 comes into contact with the tablet 12 in the cell below, and the rounded edge 4 of the pan approaches the shoulder 2 of the pan below. Figure 1 shows a slight clearance 13 between the one cell and the next, but this is exaggerated to make one cell distinct from the next; in practice the coated lower part 5 of one pan is a close fit within the card lining 10, 11 of the pan in which it is nested. Some small space 14 may be left unfilled by solid material; it affords a chamber in which may accumulate any gas evolved in the action of the cell.

The uppermost cell 15 requires a positive electrode to complete it. This is provided by a carbon coating 16 upon a tray 17 which may conveniently be formed of steel. The tray 17 is of similar form to the lower part 5 of any other of the cells in the pile. Its upper margin has a tag 18 for connection to an external circuit.

The lowermost cell 19 does not require a carbon coating 7 but may have a connector, not shown, soldered to it.

The pile of cells is compressed to ensure thorough surface contact between the several components throughout the battery, and while compressed is bound with tape 20 or otherwise secured in the compressed condition. The whole battery may be given a coating of insulation, for instance of a plastic such as polystyrene, which renders it fluid-tight, and seals any such gap as indicated at 13 between two cells. If the lip of the pan 1 is coated with insulating varnish this may unite with the plastic sheathing to complete the sealing of each individual cell. Alternatively the battery may be coated with paraffin wax.

We claim:

1. A composite electrode for a voltaic cell comprising a shallow flat-bottomed pan of electronegative metal coated on its outer surface with carbon and having walls substantially at right angles to its bottom formed with shoulders within the pan such that the internal dimensions of the lip of the pan exceed the external dimensions of the lower part of its wall.

2. A voltaic battery comprising a plurality of shallow flat-bottomed pans of electro-negative metal assembled in nested relation, a lining of paper material within each pan extending to its lip and separating it from the pan nested within it, said lining having an impervious and non-conducting border, a flat cake of depolarizer and a positive electrode placed in that order between the lining of one pan and the bottom of the pan nested within it, and electrolyte impregnating the bottom of said lining and said depolariser.

3. A voltaic battery comprising a plurality of shallow flat-bottomed pans of electro-negative metal assembled in nested relation, a bibulous layer within each pan resting on its bottom, a lining of paper material within each pan extending to its lip and separating it from the pan nested within it, said lining having an impervious and non-conducting border, a flat cake of depolarizer and a positive electrode placed in that order between the lining of one pan and the bottom of the pan nested within it, and electrolyte impregnating the bottom of said lining and said depolarizer.

4. An electric primary dry battery comprising a plurality of shallow pans of electro-negative metal having the internal dimensions of their upper part exceeding the external dimensions of their lower part, said pans being assembled in nested relation, electric insulation interposed between the cells of said pans where they lie one within the other, preventing metallic contact between them, a coating of carbon upon the outer surface of the bottom of each pan, a layer of depolarizer mix and an absorbent electrolyte-containing layer placed in that order between and filling the space between said carbon coating of each pan and the bottom of the pan in which it nests.

RICHARD PERCY RICHARDSON.
RICHARD WALTER LEWIS.

REFERENCES CITED

The following references are of record in the file of this patent:

UNITED STATES PATENTS

| Number | Name | Date |
|---|---|---|
| 303,237 | Skrivanow | Aug. 5, 1884 |
| 614,539 | Edgerton | Nov. 22, 1898 |
| 770,277 | Fiedler | Sept. 20, 1904 |
| 1,611,153 | Benner et al. | Dec. 21, 1926 |
| 2,144,574 | MacCallum | Jan. 17, 1939 |
| 2,375,875 | Sanderson | May 15, 1945 |